US006874575B2

(12) United States Patent
Kim

(10) Patent No.: US 6,874,575 B2
(45) Date of Patent: Apr. 5, 2005

(54) AIR CONDITIONING HOUSING FOR AN AIR CONDITIONER OF AN AUTOMOBILE

(75) Inventor: In Kap Kim, Taejon-Si (KR)

(73) Assignee: Halla Climate Control Corp. (KR)

( * ) Notice: Subject to any disclaimer, the term of this patent is extended or adjusted under 35 U.S.C. 154(b) by 189 days.

(21) Appl. No.: 10/032,043

(22) Filed: Dec. 21, 2001

(65) Prior Publication Data

US 2003/0205370 A1 Nov. 6, 2003

(30) Foreign Application Priority Data

Mar. 27, 2001 (KR) .......................................... 2001-15980

(51) Int. Cl.[7] ................................................ B60H 1/00
(52) U.S. Cl. ........................ 165/204; 165/43; 454/160; 454/161; 237/12.3 A; 237/12.3 B
(58) Field of Search ............................. 165/41, 42, 43, 165/203, 202; 454/156, 160, 161, 69; 237/12.3 A, 12.3 B

(56) References Cited

U.S. PATENT DOCUMENTS 6,415,857 B1 * 7/2002 Nakamura et al. .......... 165/204
6,568,468 B1 * 5/2003 Uemura et al. ............. 165/203
6,598,670 B1 * 7/2003 Hashimoto et al. ......... 165/204

FOREIGN PATENT DOCUMENTS

| JP | 10-109520 | 4/1998 |
| JP | 10-181331 | 7/1998 |
| JP | 10-181332 | 7/1998 |
| JP | 10-181336 | 7/1998 |
| JP | 10-230734 | 9/1998 |

* cited by examiner

Primary Examiner—Ljiljana Ciric
(74) Attorney, Agent, or Firm—Lowe Hauptman Gilman & Berner LLP

(57) ABSTRACT

Disclosed herewith is an air conditioner housing for automobiles and air conditioner using the same. The air conditioner housing includes a housing body having evaporator and heater core accommodating spaces. Upper and lower air passages are defined by partitioning the inner air passage of the housing body. A front foot vent is formed at the air outlet end of the lower air passage, and defrosting and face vents are formed at the air outlet end of the upper air passage. A front air passage is formed by a guide wall slantingly upwardly extended to partition the space behind the heater core accommodating space, and a rear air passage is formed behind the guide wall to communicate with the upper and lower air passages. A combined door of foot and combination door is positioned on a boundary of the rear air passage and the lower air passage. First, second and third temperature adjusting doors are rotatably disposed in front of and behind a lower half of the heater core accommodating space and in front of an upper half of the heater core accommodating space, respectively.

8 Claims, 12 Drawing Sheets

AIR CONDITIONING HOUSING FOR AN AIR CONDITIONER OF AN AUTOMOBILE

BACKGROUND OF THE INVENTION

1. Field of the Invention

The present invention relates generally to an air conditioner housing for automobiles and air conditioner using the same, in which a two-layer recirculation air/fresh air flow partitioning structure is employed, so recirculation air/fresh air can be blown independently or in combination, the heating performance is improved, a white fogging can be prevented, and the defrosting performance is improved.

2. Description of the Related Technology

In general, an air conditioner for automobiles is comprised of a air cooling apparatus and a heating apparatus. The air cooling apparatus cools the passenger compartment in such a way that air blown by the blower fan of a blower unit is cooled by heat exchange with refrigerant flowing through an evaporator while refrigerant is compressed by a compressor operated by power transmitted from an engine, compressed refrigerant is condensed in a condenser by heat exchange with ambient air blown forcibly by a cooling fan and the condensed refrigerant is returned to the compressor through a receiver dryer, an expansion valve and an evaporator, and the cooled air is discharged to the passenger compartment. The heating apparatus heats the passenger compartment in such a way that air blown by a blower fan is heated by heat exchange with coolant flowing through a heater core while the coolant passes through the heater core and is returned to an engine and the heated air is discharged to the passenger compartment.

In FIG. 11, a general air conditioner for automobiles is illustrated. In this general air conditioner, an evaporator 910 and a heater core 920 are disposed in the inner air passage of an air conditioner housing 930, and a blower 940 is disposed at the entrance of the air conditioner housing 930. The blower 940 is comprised of a blower casing 942 integrated with the air conditioner housing 930, a blower fan 944 rotatably placed in the blower casing 942, a motor 946 operated to drive the blower fan 944, and an air intake duct 948 positioned in the upper portion of the blower casing 942 and provided with an recirculation air intake opening 952, and an fresh air intake opening 954 whose degree of opening is adjusted by a door 950. Accordingly, air flows into the blower casing 942 through the recirculation air intake opening 952 or the fresh air intake opening 954 by means of suction force generated by the rotation of the blower fan 944 by the operation of the motor 946, and is blown into the inner air passage, so air is changed into cold air or warm air by the heat exchange while passing the evaporator 910 and/or the heater core 920. A defrosting vent 932 for defrosting window glasses of an automobile by discharging warm air to the window, a face vent 934 for air-conditioning the passenger compartment by discharging cold or warm air to the passenger compartment, and a foot vent 936 for air-conditioning the passenger compartment by discharging cold or warm air to the floor of the automobile are disposed at the air outlet end of the air conditioner housing 930. The degrees of opening of the vents 932, 934 and 936 are adjusted by the doors 932d, 934d and 936d in accordance with predetermined air cooling and heating modes. Additionally, a temperature adjusting door 922 is positioned in front of the heater core 920 to adjust the degrees of opening of air passages extending through and over the heater core 920. Accordingly, in a air cooling mode, since the air passage extending over the heater core 920 is opened when the temperature adjusting door 922 closes the air passage extending through the heater core 920, air having passed through the evaporator 910 is discharged to the passenger compartment through opened vents without passing through the heater core 920, thereby cooling the passenger compartment. In contrast, in an air heating mode, since the air passage extending through the heater core 920 is opened when the temperature adjusting door 922 closes the air passage extending over the heater core 920, air having passed through the evaporator 910 is passed through the heater core 920 and discharged to the passenger compartment through opened vents, thereby heating the passenger compartment.

In the general air conditioning apparatus, recirculation or fresh air is sucked into a single air passage through an opened recirculation or fresh air intake opening 952 or 954, or recirculation and fresh air is sucked into a single air passage while being mixed together when the door 950 is in a neutral position. As a result, when only fresh air is supplied to the passenger compartment during the operation of the air conditioner, the load of a compressor is increased, thereby increasing the consumption of fuel; whereas when recirculation air is circulated, air in the passenger compartment becomes contaminated, thereby injuring passengers' health. Additionally, when a mixture of recirculation and fresh air is supplied, the heating performance of the air conditioner is improved in comparison with the case where only fresh air is supplied, but passengers cannot enjoy the freshness of fresh air and the defrosting performance of the air conditioner is deteriorated because of the humidity of recirculation air.

In order to overcome the above-described shortcomings, there have been proposed air conditioners in which recirculation and fresh air is supplied to the passenger compartment in independent or combinational manner according to air cooling and heating modes.

Japanese Pat. Laid-open No. Heisei 10-109520 discloses an air conditioner in which recirculation or fresh air is supplied in a two-layer air flow structure and which is provided with two foot vents and two foot doors for adjusting the degrees of opening of the foot vents. However, in this air conditioner, while recirculation and fresh air flows through the two-layer air flow structure, the mixing of air is deteriorated in an air mixing region for a temperature adjusting door positioned in front of a heater core, so the difference in temperature occurs between front and rear foot vent sides. When the mixing of air is deteriorated, a white fogging occurs while high-temperature, high-humidity fresh air, which flows into the air conditioner when a recirculation air suction mode is shifted to a fresh air suction mode, is mixed with low-temperature, low-humidity air around the evaporator.

Japanese Pat. Laid-open No. Heisei 10-181332 discloses an air conditioner in which two doors are rotatably and adjacently positioned, the rotation areas of the two doors are partly overlapped to form a seal surface at the stop position of doors. Additionally, various air conditioners are disclosed in Japanese Pat. Laid-open No. Heisei 10-181331, Japanese Pat. Laid-open No. Heisei 10-181336 and Japanese Pat. Laid-open No. Heisei 10-230734. However, these air conditioners are problematic in that the gap between a door and an evaporator is large at an recirculation air/fresh air partitioning position and the mixing of recirculation and fresh air is increased, thereby causing the same problems as the above-described air conditioners have.

In particular, the above-described air conditioners are problematic in that air discharge to the front and rear portions of the floor of an automobile cannot be controlled effectively.

SUMMARY OF THE INVENTION

An aspect of the present invention provides an air conditioner for automobiles, in which a two-layer recirculation air/fresh air flow partitioning structure is employed, so the air-conditioning performance of the air conditioner is improved by effective air-conditioning control, a white fogging can be prevented, and the defrosting performance of the air conditioner for the windows of an automobile is improved.

Another aspect of the present invention provides an air conditioner housing for automobiles, comprising: a housing body having front and rear spaces for accommodating an evaporator and a heater core; upper and lower air passages defined by partitioning the inner air passage of the housing body between the evaporator and heater core accommodating spaces with a first partitioning wall; a front foot vent formed at the air outlet end of the lower air passage, and defrosting and face vents formed at the air outlet end of the upper air passage and selectively opened and closed by doors; a front air passage formed by a guide wall slantingly upwardly extended to partition the space behind the heater core accommodating space and positioned between the guide wall and the upper half of the heater core and communicated with the upper air passage, and a rear air passage formed behind the guide wall to communicate with the upper and lower air passages; a combined door of foot and combination door positioned on the boundary of the rear air passage and the lower air passage for adjusting degrees of opening of the front foot vent and the rear air passage; and first, second and third temperature adjusting doors rotatably disposed in front of and behind a lower half of the heater core accommodating space and in front of an upper half of the heater core accommodating space, respectively.

The air conditioner housing may further comprise a rear vent housing including a rear foot vent, the rear vent housing being attached to a portion of a rear wall of the housing body ranging from a part of the rear air passage to the lower air passage; a first communication vent formed on the portion of the rear wall of the housing body for allowing the rear air passage and the rear foot vent to communicate with each other; and a first communication door operated in conjunction with the combined door of foot and combination door for adjusting a degree of opening of the first communication foot vent.

The air conditioner housing may further comprise a second communication foot vent formed on the rear wall of the housing body, the degree of opening of the second communication foot vent being adjusted by the second communication door.

Another aspect of the present invention provides an air conditioner for automobiles, comprising one of the above-described air conditioner housing, an evaporator and a heater core disposed in the front of and behind the first partitioning wall and a blower disposed at the entrance end of the air conditioner housing.

The blower may comprise a scroll housing positioned at the entrance of the air conditioner housing and divided into upper and lower scroll housing parts by a second partitioning wall, the upper and lower scroll housing parts communicating with the upper and lower air passages, respectively; first and second blower fans placed in the upper and lower scroll housing parts, respectively; a motor for rotating the blower fans; an air intake duct for sucking fresh air and/or recirculation air to the scroll housing by adjusting the degree of the fresh or recirculation air intake opening by a changeover door; and an air guide duct connecting the air intake duct and the entrance of the air conditioner housing to guide air sucked into the air intake duct to the lower scroll housing part.

The air conditioner may further comprise fresh/recirculation air partitioning means mounted on the top of the upper scroll housing part so that when the changeover door is rotated to a predetermined position, the fresh/recirculation air partitioning means is brought into contact with the changeover door and partitions the upper and lower scroll housing parts, thus allowing only fresh air to flow into the upper scroll housing part and only recirculation air to flow into the lower scroll housing part.

Another aspect of the present invention provides an air conditioner for use in an automobile. The air conditioner comprises a housing comprising a plurality of partitions, a first heat exchanger enclosed in the housing and configured to pass an airflow therethrough, and a second heat exchanger enclosed in the housing. The partitions of the housing define a first air passage and a second air passage between the first and second heat exchangers so that the airflow passing through the first heat exchanger can be divided into first and second airflows through the first and second air passages, respectively. The partitions of the housing further define a third air passage communicable with the first and second air passages and configured to allow at least one of the first and second airflows to detour the second heat exchanger.

The air conditioner may further comprise a first door located between the second and third air passages, wherein the first door is configured to adjust the amount of at least part of the second airflow from the second air passage to the third air passage.

In the air conditioner, the housing defines a first vent configured to discharge at least part of the second airflow therefrom.

The air conditioner may further comprise a second door configured to adjust the amount of at least part of the second airflow to be discharged through the first foot vent. The plurality of partitions comprise a first partition having a free end and located in a place adjacent to the first vent in the third air passage, the first partition projected from an inner surface of the housing such that the second door adjusts the at least part of the second airflow to be discharged through the first vent according to whether the second door contacts with the free end or not. The air conditioner may further comprise a structure attached to the housing and having a second vent, wherein the structure is configured to receive an airflow flowing through the third air passage and to discharge the air flow through the second vent. The structure comprises a third door configured to adjust the amount of the airflow to be discharged through the second vent. The second and third doors are connected to each other by a hinged joint such that the second and third doors can be operated at the same time by rotation of the hinged joint.

The air conditioner may further comprise a structure attached to the housing and including a communication vent and a second vent, wherein the communication vent is configured to receive an airflow flowing through the third air passage and the second vent is configured to discharge the received airflow therefrom.

The plurality of partitions comprise a second partition placed between the first heat exchanger and the second heat exchanger, and configured to divide the airflow into the first and second airflows. The second heat exchanger comprises first and second portion configured to allow the first and second airflows to pass therethrough, respectively. The plurality of partitions comprise a third partition located between the second heat exchanger and the third air passage and configured to guide the first airflow that has passed the second portion of the second heat exchanger toward the third air passage. The air conditioner may further comprise a fourth door located between the second heat exchanger and the third air passage and configured to adjust the amount of the second airflow that has passed through the second portion of the second heat exchanger and is flowing to the third air passage.

Another aspect of the present invention provides a method of operating an air conditioner. The method comprises passing an airflow through a first heat exchanger; flowing the airflow from the first heat exchanger through first and second air passages located between the first and second heat exchangers, thereby forming first and second airflows, respectively, and flowing at least part of the first and second airflows through a third air passage configured to allow the at least part of the first and second airflows therethrough to detour the second heat exchanger.

The method may further comprise discharging at least part of the second airflow to the outside of the air conditioner. The method may further comprise adjusting the amount of the airflow to be discharged. The method may further comprise passing the first and second airflows through first and second portions of the second heat exchanger, respectively. The method may further comprise adjusting the amount of the second airflow that has passed through the second portion of the second heat exchanger and is flowing to the third air passage. The method may further comprise adjusting the amount of at least part of the second airflow from the second air passage to the third air passage.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
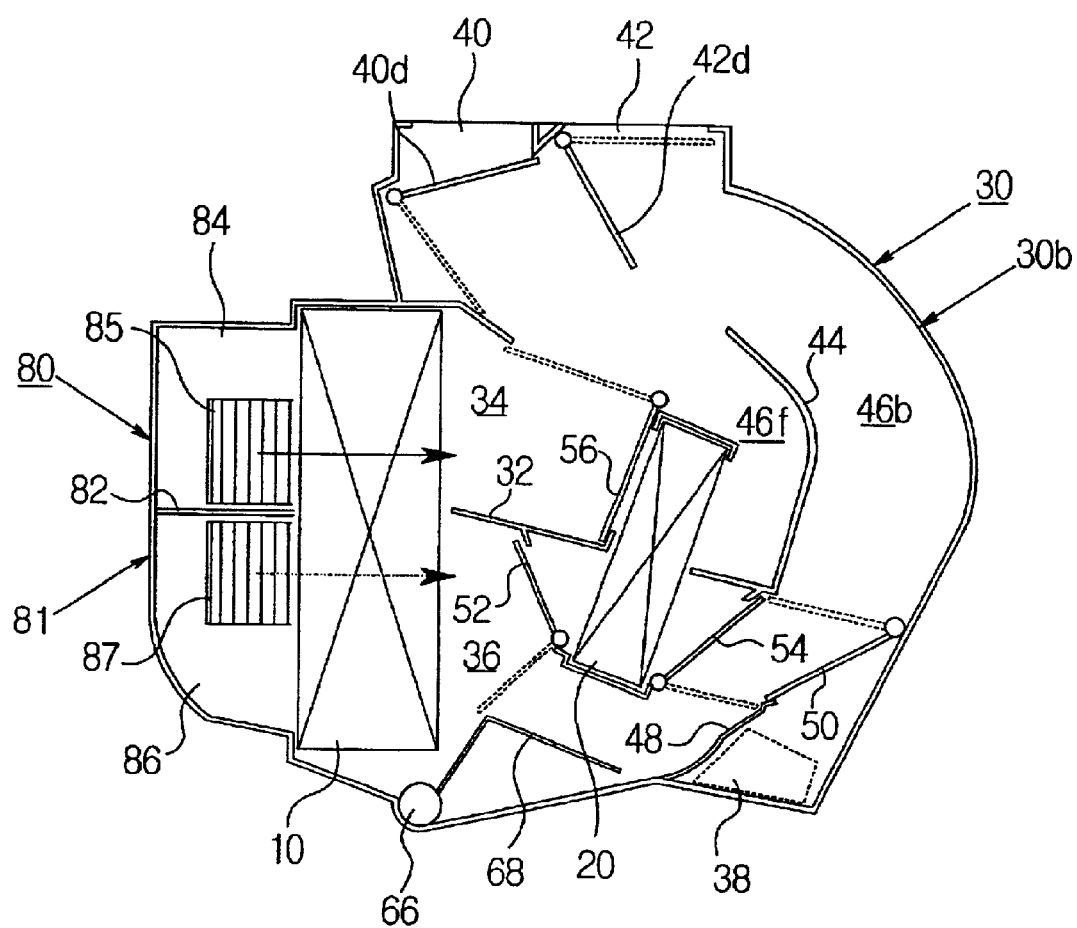
FIG. 1 is a partial cross section showing an air conditioner for automobiles to which an air conditioner housing of the present invention is applied.

As illustrated in FIG. 1, reference numeral 30 designates an air conditioner housing in accordance with the present invention. An evaporator 10 and a heater core 20 are disposed in the front and rear portions of the inner air passage of a housing body 30b, respectively. The evaporator 10 is placed to occupy most of the entrance of the inner air passage of the housing body 30b, and the heater core 20 is placed in the inner air passage of the housing body 30b at a position spaced from the bottom of the housing body 30b by a predetermined interval, that is, in the center portion of the interior passage of the housing body 30b. The inner air passage of the housing body 30b is divided into upper and lower air passages 34 and 36 by a first partitioning wall 32 longitudinally placed through the center portion of the inner air passage. In more detail, the first partitioning wall 32 is extended from the position behind the evaporator 10 to the position in front of the heater core 20. Accordingly, when the heater core 20 is disposed in the air conditioner housing 30, the upper half of the heater core 20 is positioned at the upper air passage 34 while the lower half of the heater core 20 is positioned at the lower air passage 36. Additionally, when the evaporator 10 is disposed in the air conditioner housing 30, the upper half of the evaporator 10 is positioned at the entrance side of the upper air passage 34 while the lower half of the evaporator 10 is positioned at the entrance side of the lower air passage 36.

As a result, when the evaporator 10 and the heater core 20 are disposed in the air conditioner housing 30, air having passed through the evaporator 10 and flowing through the upper air passage 34 not only passes through the upper portion of the heater core 20 but also passes over the heater core 20. In contrast, air flowing through the lower air passage 36 not only passes through the lower half of the heater core 20 but also passes under the heater core 20.

In addition, a front foot vent 38 is formed at the outlet of the lower air passage 36 (that is, the lower end portion of the housing body 30b) to discharge air toward the front portion of the floor of an automobile. Additionally, a defrosting vent 40 for discharging air to the window of an automobile and a face vent 42 for discharging air to the upper half of the passenger compartment are formed at the outlet of the upper air passage 34 (that is, the upper end portion of the housing body 30b). The degree of opening of the defrosting vent 40 is adjusted according to the rotation angle of the defrosting door 40d, while the degree of opening of the face vent 42 is adjusted according to the rotation angle of the face door 42d. The opening and closing structure of the front foot vent 38 will be described later.

In accordance with the present invention, a guide wall 44 is extended from the rear end of the first partitioning wall 32 behind the heater core 20 toward the position between the defrosting vent 40 and the face vent 42, so the space behind the heater core 20 is divided into two sub-spaces. Accordingly, a front air passage 46f is formed between the guide wall 44 and the heater core 20 to communicate with the upper air passage 34, and a rear air passage 46b is formed behind the guide wall 44 to communicate with both the upper air passage 34 and the lower air passage 36. A baffle 48 is placed at the rear end of the lower air passage 36 to guide air flowing through the lower air passage 36 to the front foot vent 38 or the rear air passage 46b, and a combined door of foot and combination door 50 is rotatably positioned in the boundary of the lower air passage 36 and the rear air passage 46b to adjust the degrees of opening of the front foot vent 38 and the rear air passage 46b. Accordingly, when the combined door of foot and combination door 50 is rotated to be brought into contact with the free end of the baffle 48 at its free end, the front foot vent 38 is closed and the lower air passage 36 does not communicate with the front foot vent 38 but communicates with the rear air passage 46b. On the other hand, when the combined door of foot and combination door 50 is rotated to be brought into contact with the guide wall 44 at its free end, the lower air passage 36 does not communicate with the rear air passage 46b but communicates with the front foot vent 38.

A first temperature adjusting door 52 and a second temperature adjusting door 54 are rotatably positioned in front of and behind the lower half of the heater core 20 to adjust the temperature of air to be discharged into the passenger compartment by adjusting the degree of opening of the air passage extended to the heater core 10. Accordingly, when the first and second temperature adjusting doors 52 and 54 are operated to open an air passage extended to the heater core 20, a part of air having passed through the evaporator 10 passes through the heater core 20 and the remaining air passes under the heater core 20 without passing through the heater core 20. Thereafter, the air flows toward the rear air passage 46b or the front foot vent 38 according to the rotation angle of the combined door of foot and combination door 50. In such a case, since the lower air passage 36 is closed when the second temperature adjusting door 54 is fully opened and brought into contact with the baffle 48 at its front end, the air having passed under the heater core 20 without passing through the heater core 20 cannot flow toward the rear air passage 46b and the front foot vent 38 and only the air having passed through the lower half of the heater core 20 can flow toward the front air passage 46b or the front foot vent 38 according to the rotation angle of the combined door of foot and combination door 50. Additionally, when the first and second temperature adjusting doors 52 and 54 close the lower half of the heater core 20, air flowing through the lower air passage 36 does not pass through the heater core 20 but passes under the heater core 20. Thereafter, the air flows toward the rear air passage 46b or the front foot vent 38 according to the rotation angle of the combined door of foot and combination door 50.

A third temperature adjusting door 56 is rotatably positioned in front of the upper half of the heater core 20 to adjust the temperature of air to be discharged to the passenger compartment by adjusting the degrees of opening of the air passage extended to the upper half of the heater core 20 and the air passage extended over the heater core 20. The temperature adjusting doors 52, 54 and 56 are operated in cooperation with one another. Accordingly, when the third temperature adjusting door 56 closes the upper half of the heater core 20 while the evaporator 10 and the heater core 20 are mounted in the air conditioner housing 30, air having passed through the evaporator 10 and flowing through the upper air passage 34 does not pass through the upper half of the heater core 20 but passes over the heater core 20. Thereafter, the air flows toward the defrosting vent 40 or the face vent 42. Additionally, when the third temperature adjusting door 56 is operated to open the air passage extended to the upper half of the heater core 20 and close the air passage extended over the heater core 20, air flowing through the upper air passage 34 passes through the heater core 20, is guided through the front air passage 46f situated in front of the guide wall 44, and flows toward the defrosting vent 40 or the face vent 42.

For example, in a cooling mode in which the temperature adjusting doors 52, 54 and 56 completely close the air passages extended to the heater core 20, when the defrosting vent 40 and the face vent 42 are opened, air flowing through the lower air passage 36 passes under the heater core 20 and through the rear air passage 46b without passing through the heater core 20 and flows toward the defrosting vent 40 and the face vent 42 without flowing toward the front foot vent 38. Additionally, air flowing through the upper air passage 34 passes over the heater core 20 without passing through the heater core 20 and flows toward the defrosting vent 40 and the face vent 42. In a heating mode in which the temperature adjusting doors 52, 54 and 56 open the air passages extended to the heater core 20, when the combined door of foot and combination door 50 is brought into contact with the guide wall 44 at its front end and closes the rear air passage 46b, air flowing through the upper air passage 34 passes through the heater core 20 and flows through the front air passage 46f, and air flowing through the lower air passage 36 passes through the heater core 20 and flows toward the front foot vent 38 but does not flow toward the rear air passage 46b.

In FIG. 1, reference numeral 66 designates a condensed water outlet for discharging condensed water formed on the portion of the bottom of the housing body 30b under the evaporator 10, and reference numeral 68 designates a wedge-shaped baffle mounted on the portion of the bottom of the housing body 30b under the lower air passage 36 to guide to the condensed water outlet 66 condensed water flowing under the heater core 20 in the cooling mode.

Figure 2A:
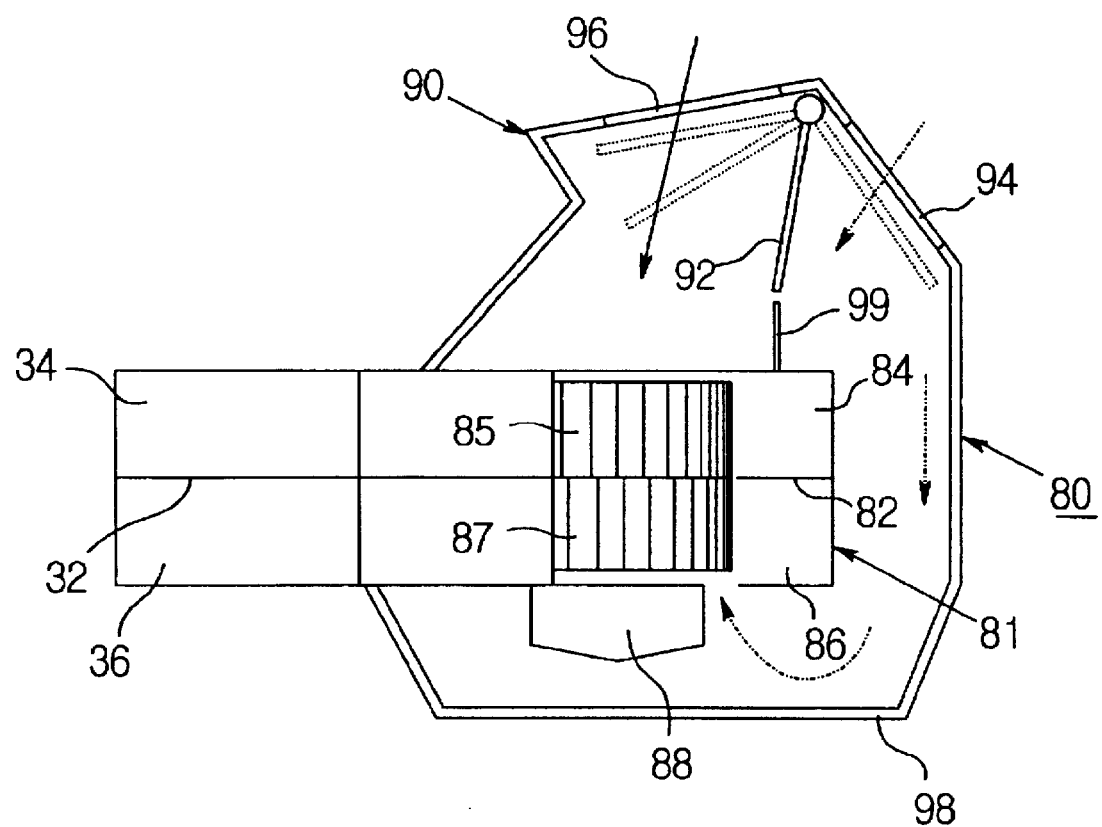
FIG. 2a is a partial cross section showing a blower that constitutes the air conditioner of the present invention.

Meanwhile, as depicted in FIG. 2a, the air conditioner of the present invention further comprises a blower 80 that is placed at the entrance of the housing body 30b of the air conditioner housing 30. The scroll housing 81 of the blower 80 is divided into an upper scroll housing part 84 communicating with the upper air passage 34 and a lower scroll housing part 86 communicating with the lower air passage 36 by a second partitioning wall 82. Additionally, an upper blower fan 85 is rotatably mounted in the upper scroll housing part 84 and a lower blower fan 87 is rotatably mounted in the lower scroll housing part 86. The upper and lower blower fans 85 and 87 are adapted to be rotated together by a motor 88. Accordingly, air blown by the upper blower fan 85 is sent to the upper air passage 34, while air blown by the lower blower fan 87 is sent to the lower air passage 36.

Figure 2B:
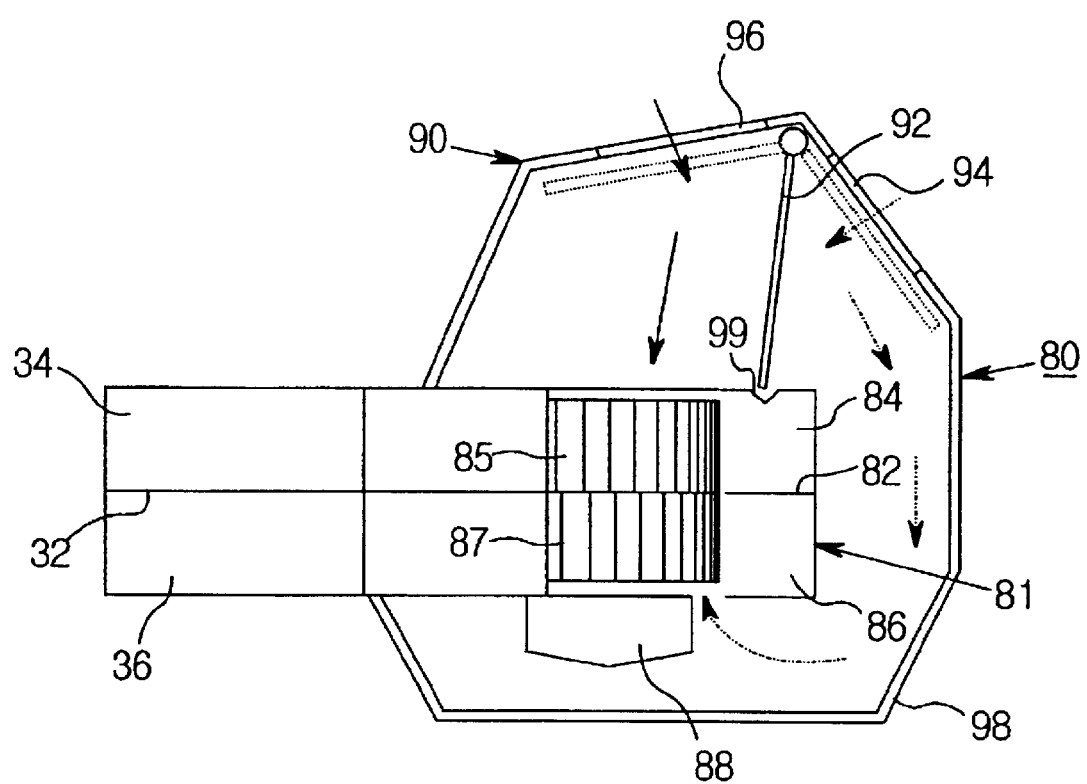
FIG. 2b is a partial cross section showing another blower that constitutes the air conditioner of the present invention.

Reference numeral 90 designates an air intake duct for sucking recirculation or fresh air into the scroll housing 81. The air intake duct 90 is provided with an recirculation air intake opening 94 and an fresh air intake opening 96 formed on the upper portion of the air intake duct 90 and a changeover door 92 adapted to adjust the degrees of opening of the recirculation and fresh air intake openings 94 and 96 by its rotation angle. In order to guide recirculation and fresh air toward the lower scroll housing part 86, the air conditioner of the present invention further comprises an air guide duct 98 connected to an air intake duct 90 and the entrance of the air conditioner housing 30. Fresh/recirculation air partitioning means 99 is preferably mounted on the top of the upper scroll housing part 84 so that when the changeover door 92 is rotated to a predetermined position, the fresh/recirculation air partitioning means 99 is brought into contact with the changeover door 92 and partitions the upper and lower scroll housing parts 84 and 86, thus allowing only fresh air to flow into the upper scroll housing part 84 and only recirculation air to flow into the lower scroll housing part 86. The fresh/recirculation air partitioning means 99 can be projection-shaped as shown in FIG. 2a, or depression-shaped as shown in FIG. 2b.

Figure 3:
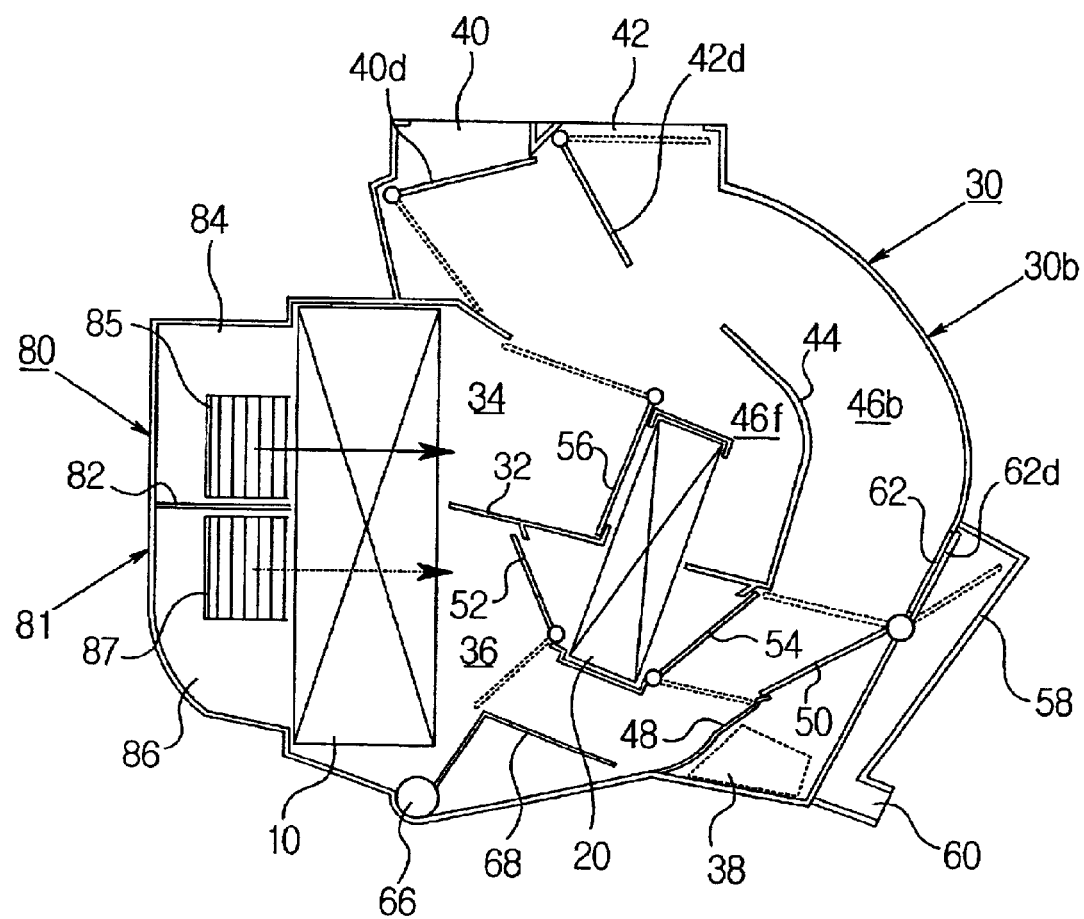
FIG. 3 is a partial cross section showing an air conditioner for automobiles to which another air conditioner housing of the present invention is applied.

In the meantime, FIG. 3 illustrates an air conditioner to which another air conditioner housing 30 is applied. This air conditioner housing 30 is constructed to effectively remove fog from not only the front window of an automobile but also the rear window of the automobile by discharging air flowing through the upper air passage 34 toward the defrosting vent 40 and the rear portion of the floor of an automobile. In more detail, a rear vent housing 58 is attached to the rear portion of the housing body 30b, and is provided with a rear foot vent 60 for discharging air to the rear portion of the floor of an automobile. The rear foot vent 60 communicates with the rear air passage 46b through a first communication foot vent 62 formed in the rear portion of the housing body 30b. The degree of opening of the first communication foot vent 62 can be adjusted by the first communication door 62d operated together with the combined door of foot and combination door 50. That is, the combined door of foot and combination door 50 is connected to the first communication door 62d through a hinge to be operated together therewith.

Figure 4:
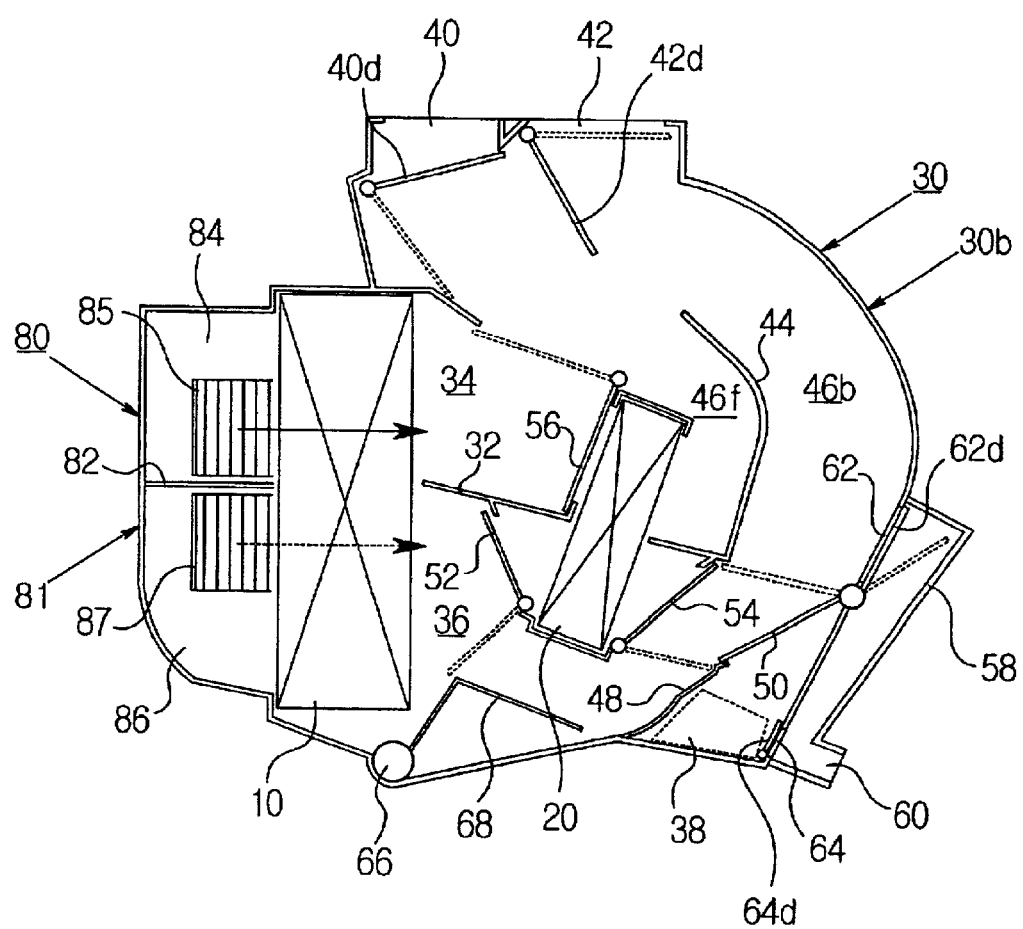
FIG. 4 is a partial cross section showing an air conditioner for automobiles to which a further air conditioner housing of the present invention is applied.

According to the present invention, as shown in FIG. 4, a second communication vent 64 can be further formed in the rear portion of the housing body 30b to allow the front and rear foot vents 38 and 60 to communicate with each other. The degree of opening of the second communication foot vent 64 can be adjusted by the second communication door 64d.

As shown in FIG. 4, in the air conditioner to which this type of air conditioner housing 30 is applied, when the combined door of foot and combination door 50 closes the rear air passage 46b, the first communication door 62d is operated together with the combined door of foot and combination door 50 to open the first communication foot vent 62. As a result, since air flowing through the upper air passage 34 in the heating mode not only flows toward the defrosting vent 40 and/or the face vent 42 but also is discharged to the rear portion of the floor of an automobile through the rear air passage 46b, the first communication foot vent 62 and the rear foot vent 60, fog formed on the front window of an automobile is removed by dry air discharged through the defrosting vent 40 and fog formed on the rear window of the automobile is simultaneously removed by dry air discharged through the rear foot vent 60. In such a case, the flow resistance of air against the upper air passage 34 is decreased, and reduction in the blown air volume is lessened in that the remaining fresh air other than a part of fresh air discharged to the passenger compartment through the defrosting vent 40 is discharged to the rear portion of the floor of an automobile. Consequently, this air conditioner is advantageous in that the total air volume discharged to the passenger compartment is increased, thereby improving the heating performance of the air conditioner.

Figure 5:
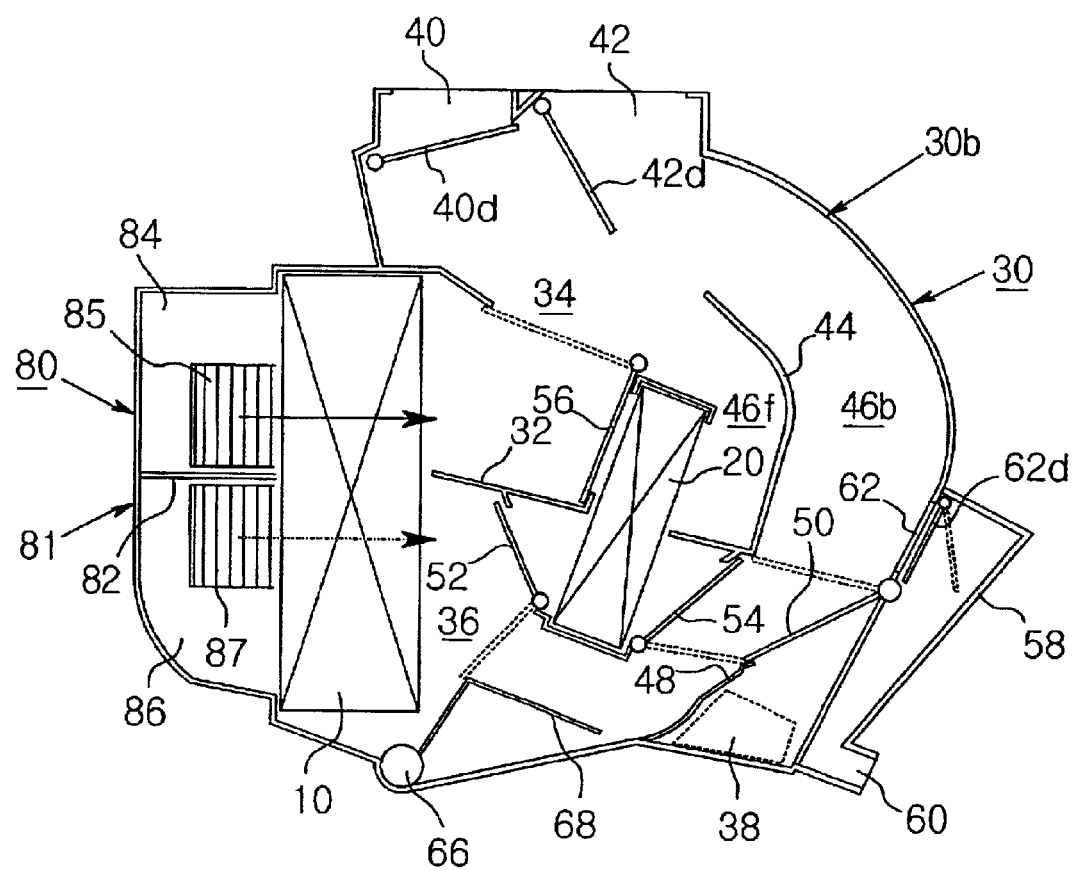
FIG. 5 is a partial cross section showing an air conditioner for automobiles to which yet another air conditioner housing of the present invention is applied.

FIG. 5 illustrates an air conditioner for automobiles to which a further air conditioner housing of the present invention is applied. Since this air conditioner housing 30 is similar to the above-described air conditioner housings 30 except that the first communication door 62d is constructed separately from the combined door of foot and combination door 50 so that the first communication door 62d opens the first communication foot vent 62 in a foot vent or mixing mode and is operated together with the combined door of foot and combination door 50, the same reference numerals are assigned to the same elements and the description of the elements are omitted.

Various air intake modes in the air conditioner of the present embodiments are described hereinafter.

In a fresh air intake mode, the recirculation air intake opening 94 is closed and the fresh opening 96 is opened by the changeover door 92. Accordingly, fresh air flows into the scroll housing 81 through only the fresh air intake opening 96. The fresh air flows not only to the upper scroll housing part 84, but also to the lower scroll housing part 86 through the air guide duct 98. The fresh air can be blown to the upper and lower air passages 34 and 36 by the upper and lower blower fans 85 and 87. In a cooling mode, the fresh air is changed to cold air while passing through the evaporator 10, while in a heating mode, the fresh air is changed to warm air while passing through the heater core 20. Thereafter, the cold and warm air is discharged into the passenger compartment through the vents opened according to an air discharge mode, thus being utilized to air-condition the passenger compartment. Temperature adjustment can be achieved by adjusting the air volume by manipulating the temperature adjusting doors 52, 54 and 56. Additionally, the mode for discharging air to the passenger compartment can be properly controlled according to the degrees of opening of the vents determined by the operation of the doors, fog formed on the front and rear windows of an automobile can be removed by the operation of the defrosting door 40d, the combined door of foot and combination door 50 and the first communication door 62d, and these operations will be described in detail later.

In a recirculation air intake mode, the fresh air intake opening 96 is closed and the recirculation air intake opening 94 is opened by the changeover door 92. Accordingly, only recirculation air can flow into the scroll housing 81 through the recirculation air intake opening 94, and the remaining operation is the same as the operation in the fresh air intake mode.

Meanwhile, in an recirculation air/fresh air partitioning intake mode, the free end of the changeover door 92 is rotated to the recirculation air/fresh air partitioning means 99, so the fresh and recirculation air intake openings 96 and 94 are all opened. However, the fresh air intake opening 96 is situated to communicate with the lower scroll housing part 86, and the recirculation air intake opening 94 is situated to communicate with the lower scroll housing part 86. Accordingly, only fresh air is blown to the upper air passage 34, and only recirculation air is blown to the lower air passage 36. In this fresh air/recirculation air partitioning intake mode, the air passage in the housing body 30b and the process of discharging air into the passenger compartment are the same as those in the fresh air intake mode and the recirculation air intake mode. However, in the fresh air/recirculation air partitioning intake mode, recirculation and fresh air is discharged to the passenger compartment in a bi-level state, thus allowing the passenger compartment to be comfortable. For example, when the combined door of foot and combination door 50 is rotated to be brought into contact with the guide wall 44 at its free end, fresh air flowing through the upper air passage 34 and recirculation air flowing through the lower air passage 36 do not mixed each other, thus recirculation and fresh air is discharged to the passenger compartment in a bi-level state.

In a combined recirculation air/fresh air intake mode, the changeover door 92 is rotated to a position between the fresh air intake opening 96 and the recirculation air/fresh air partitioning means 99, so the fresh and recirculation air intake openings 96 and 94 are all opened as in the recirculation air/fresh air partitioning intake mode. However, in the combined recirculation air/fresh air intake mode, due to the opening angle of the changeover door 92, recirculation air flowing through the recirculation air intake opening 94 easily flows to both the lower scroll housing part 86 and the upper scroll housing part 84, but fresh air flowing through the fresh air intake opening 96 has difficulty in flowing to the lower scroll housing part 86. Accordingly, fresh and recirculation air flows into the upper scroll housing part 84 while being mixed together, and only recirculation air flows into the lower scroll housing part 86, so the air blown to the upper air passage 34 by the upper blower fan 85 is combined recirculation/fresh air while the air blown to the lower air passage 36 by the lower blower fan 87 is recirculation air. The air is changed to cold or warm air while passing through the evaporator 10 and/or the heater core 20, and discharged to the passenger compartment through the vents, thus being utilized to air-condition the passenger compartment. The combined recirculation air/fresh air intake mode is useful for the case where the intermittent introduction of fresh air is needed to supply fresh air to the passenger compartment because recirculation air becomes contaminated when the air conditioner is operated for a long time in the recirculation air intake mode to cool the passenger compartment. In the air conditioners disclosed in the description of the related technology, high-temperature, high-humidity fresh air flows to the air conditioner when the recirculation air intake mode is shifted to the fresh air intake mode, and the fresh air is mixed with low-temperature, low-humidity air around the evaporator 10, thus causing a white fogging in the outlets of the vents. However, in the air conditioner of the present invention, fresh and recirculation air is mixed in the air intake duct 90 in advance, so differences in temperature and humidity are reduced by the mixing of high-temperature, high-humidity fresh air and low-temperature, low-humidity recirculation air. Consequently, in this state, the mixed air is blown to the evaporator 10, thereby preventing a white fogging from being created.

Hereinafter, various modes for discharging air blown according to each set air intake mode is set to the passenger compartment are described.

Figure 6:
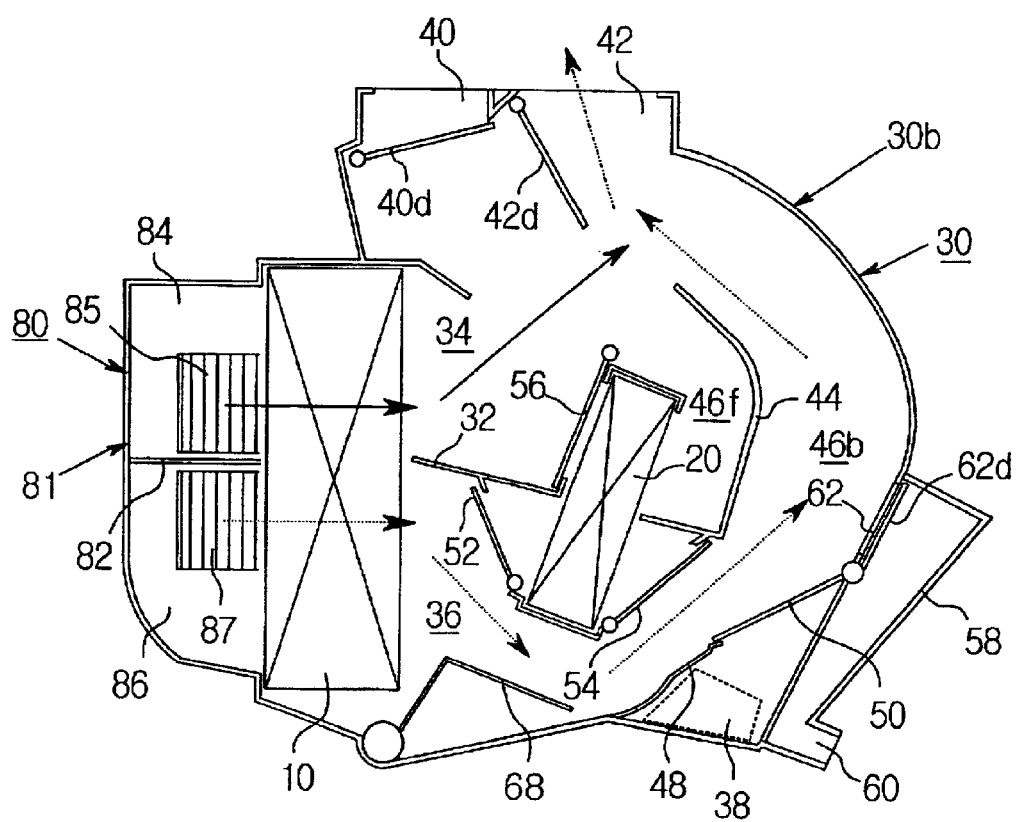
FIG. 6 is a partial cross section showing the flows of air in the air conditioner of FIG. 3 in a cooling face vent mode.

In a cooling face vent mode, as shown in FIG. 6, the first, second and third temperature adjusting doors 52, 54 and 56 are operated to close the air passages extended to the heater core 20. Additionally, the defrosting door 40*d* is operated to close the defrosting vent 40, and the face door 42*d* is operated to open the face vent 42. Further, the combined door of foot and combination door 50 is brought into contact with the free end of the baffle 48 at its free end to close the front foot vent 38 and the first communication door 62*d* is operated in conjunction with the combined door of foot and combination door 50 to close the first communication foot vent 62, so the lower air passage 36 communicates with the rear air passage 46*b* but does not communicate with the front and rear foot vents 38 and 60. As a result, the lower air passage 36 can communicate with the rear air passage 46*b*. In this mode, air flowing through the upper and lower air passages 34 and 36 flows toward the face vent 42 and is discharged to the passenger compartment. In this case, the air intake mode is preferably an recirculation air intake mode. In the air conditioner of the present invention, the heater core 20 is situated at a position spaced apart from the bottom of the housing body 30*b*, so cold air flows through the portion of the lower air passage 36 under the heater core 20 in the cooling mode, thereby improving the cooling performance of the air conditioner.

Figure 7:
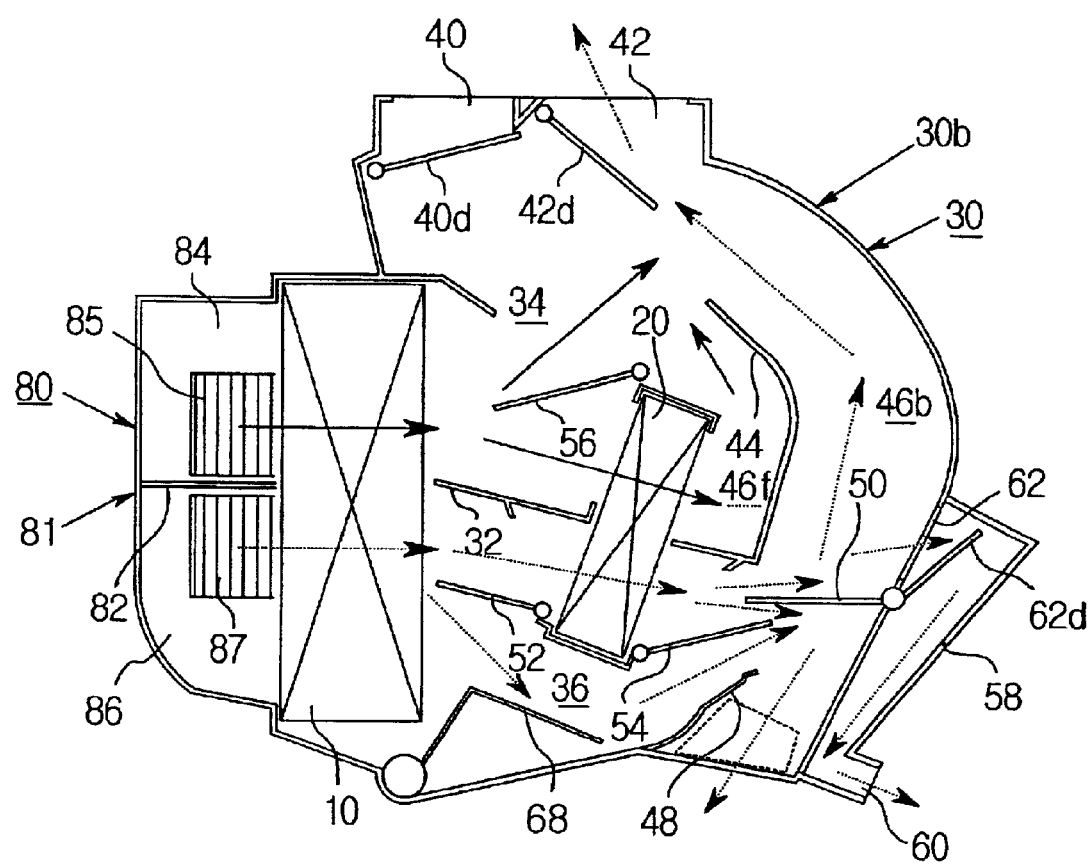
FIG. 7 is a partial cross section showing the flows of air in the air conditioner of FIG. 3 in a cooling bi-level mode.

In a cooling bi-level mode, as shown in FIG. 7, the first, second and third temperature adjusting doors 52, 54 and 56 are operated to open the air passages extended to the heater core 20. The doors 52, 54 and 56 are rotated to their neutral positions. Additionally, the combined door of foot and combination door 50 is operated to allow its free end to be situated between the guide wall 44 and the baffle 48 (that is, a neutral position), so the lower air passage 36 is allowed to communicate with the front foot vent 38 and the rear air passage 46*b*. Additionally, the first communication door 62*d* is operated to open the first communication foot vent 62. Although not shown, the second communication door 64*d* is operated to open the second communication foot vent 64 when the air conditioner is provided with the second communication door 64*d*. Additionally, the defrosting door 40*d* is operated to close the defrosting vent 40, and the face door 42*d* is operated to open the face vent 42. Accordingly, air flowing through the lower air passage 36 passes through the lower half of the heater core 20 and under the heater core 20 and is integrated behind the heater core 20, and is discharged to the front and rear portions of the floor of an automobile. Additionally, a part of air having passed through the lower half of the heater core 20 flows to the rear air passage 46*b* and toward the face vent 42, and the remaining air is discharged to the rear portion of the floor of the passenger compartment through the first communication foot vent 62 and the rear foot vent 60. 25% of air is preferably discharged through the front foot vent 38, and 15% of air is preferably discharged through the rear foot vent 60. In the meantime, a part of air flowing through the upper air passage 34 passes through the air passage extended to the upper half of the heater core 20 and flows toward the face vent 42 along the front surface of the guide wall 44, and the remaining air passes over the heater core 20 and flows toward the face vent 42, thus finally being mixed with each other. This air is mixed with the air having passed through the lower half of the heater core 20 and the rear air passage 46*b* and blown toward the face vent 42, and discharged through the face vent 42 to the upper half of the passenger compartment. In this mode, the air volume discharged through the face vent 42 is preferably about 60% of the total air volume. Additionally, in the bi-level mode, the air intake mode is preferably an recirculation or fresh air intake mode.

Figure 8:
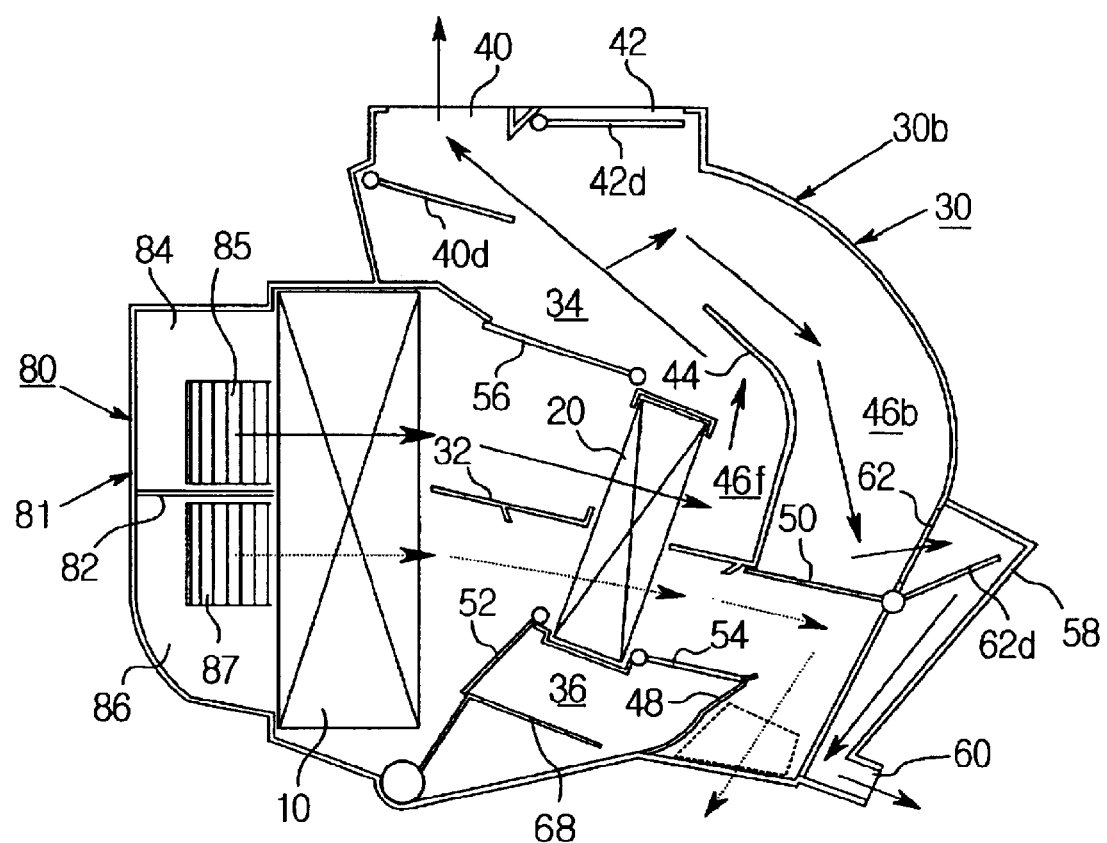
FIG. 8 is a partial cross section showing the flows of air in the air conditioner of FIG. 3 in a heating foot and defrosting mode.

In a heating foot and defrosting mode, as shown in FIG. 8, the first and second temperature adjusting doors 52 and 54 are operated to both open the air passage extended to the lower half of the heater core 20 and close the air passage extended under the heater core 20. Accordingly, all the air flowing through the lower air passage 36 passes through the heater core 20. Additionally, the combined door of foot and combination door 50 is operated to prevent the lower air passage 36 from communicating with the rear air passage 46*b* and open the first communication foot vent 62 by being brought into contact with the baffle 48 at its free end. Although not shown in the drawings, when the air conditioner is provided with the second communication door 64*d*, the second communication door 64*d* is operated to open the second communication foot vent 64. Accordingly, air having passed through the lower half of the heater core 20 is discharged to the passenger compartment through the front and rear foot vents 38 and 60. Meanwhile, the third temperature adjusting door 56 is operated to both close the air passage extended over the heater core 20 and open the air passage extended to the upper half of the heater core 20. Additionally, the defrosting door 40*d* is operated to open the defrosting vent 40, and the face door 42*d* is operated to close the face vent 42. Accordingly, all the air flowing through the upper air passage 34 passes through the heater core 20, and flows toward the defrosting vent 40. A part of air flowing toward the defrosting vent 40 is discharged to the window of an automobile through the defrosting vent 40, and the remaining air is discharged to the rear portion of the floor of the passenger compartment through the rear air passage 46b, the first communication vent 62 and the rear foot vent 60. In this mode, when the second communication foot vent 64 is opened, the air volume discharged through the defrosting vent 40 is preferably 25% of the total air volume discharged to the passenger compartment, the air volume discharged through the front foot vent 48 is preferably 45%, and the air volume discharged through the rear foot vent 60 is preferably 30%. In this case, the air intake mode is an recirculation air/fresh air partitioning intake mode (or fresh air intake mode). During an air intake mode, fresh air flows through the upper air passage 34 and recirculation air (or fresh air) flows through the lower air passage 36. Accordingly, air discharged through the defrosting vent 40 is fresh air, air discharged through the front foot vent 38 is recirculation air (or fresh air), and air discharged through the rear foot vent 60 is a mixture of recirculation and fresh air when the second communication foot vent 64 is opened or fresh air when the second communication foot vent 64 is closed.

Figure 9:
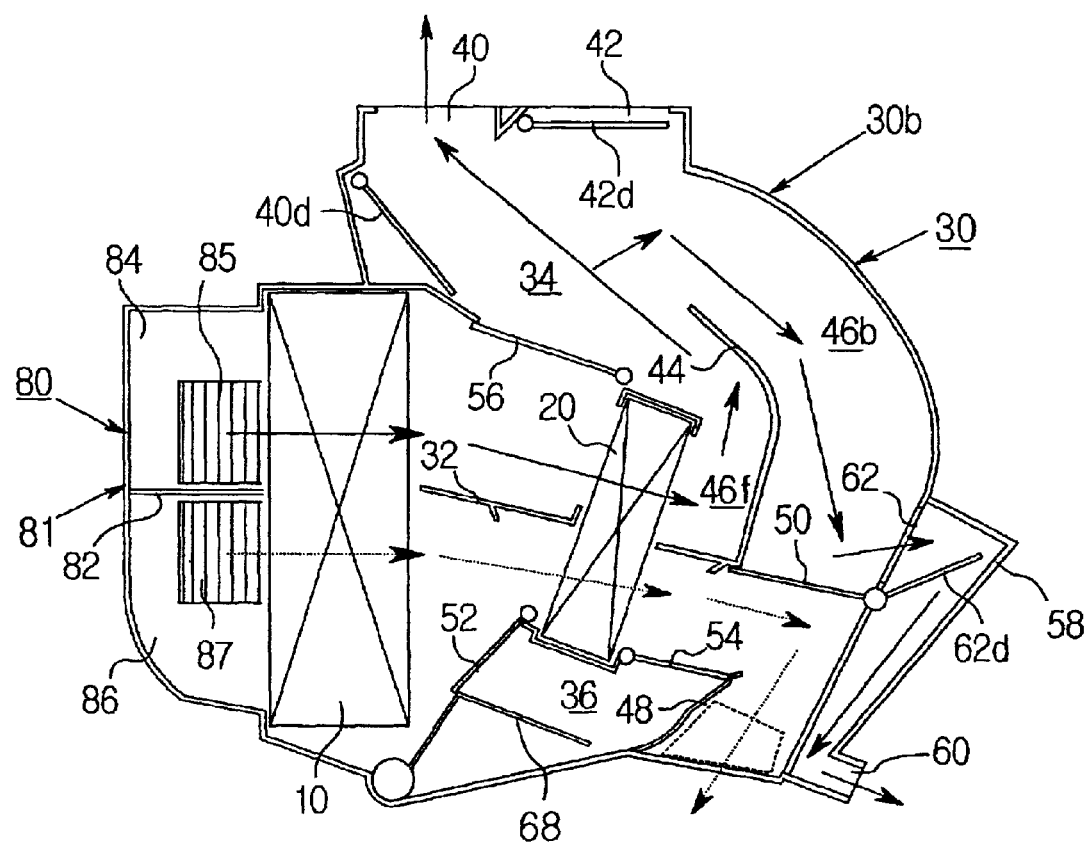
FIG. 9 is a partial cross section showing the flows of air in the air conditioner of FIG. 3 in a heating mixing mode.

In a heating mixing mode, as shown in FIG. 9, the doors are operated the same as those in the heating foot and defrosting mode. However, in this mode, the degree of opening of the defrosting vent 40 is large in comparison with that in the heating foot and defrosting mode. Additionally, when the second communication foot vent 64 (not shown in FIG. 9) is opened, the air volume discharged through the defrosting vent 40 is preferably 45%, the air volume discharged through the front foot vent 38 is preferably 20%, and the air volume discharged through the rear foot vent 60 is preferably 35%. In this case, the air intake mode is an recirculation air/fresh air partitioning intake mode. During an air intake mode, fresh air flows through the upper air passage 34 and recirculation airflows through the lower air passage 36. Accordingly, air discharged through the defrosting vent 40 is fresh air, air discharged through the front foot vent 38 is recirculation air, and air discharged through the rear foot vent 60 is a mixture of recirculation and fresh air. Additionally, when the second communication foot vent 64 is closed, air discharged through the rear foot vent 60 is fresh air.

Figure 10:
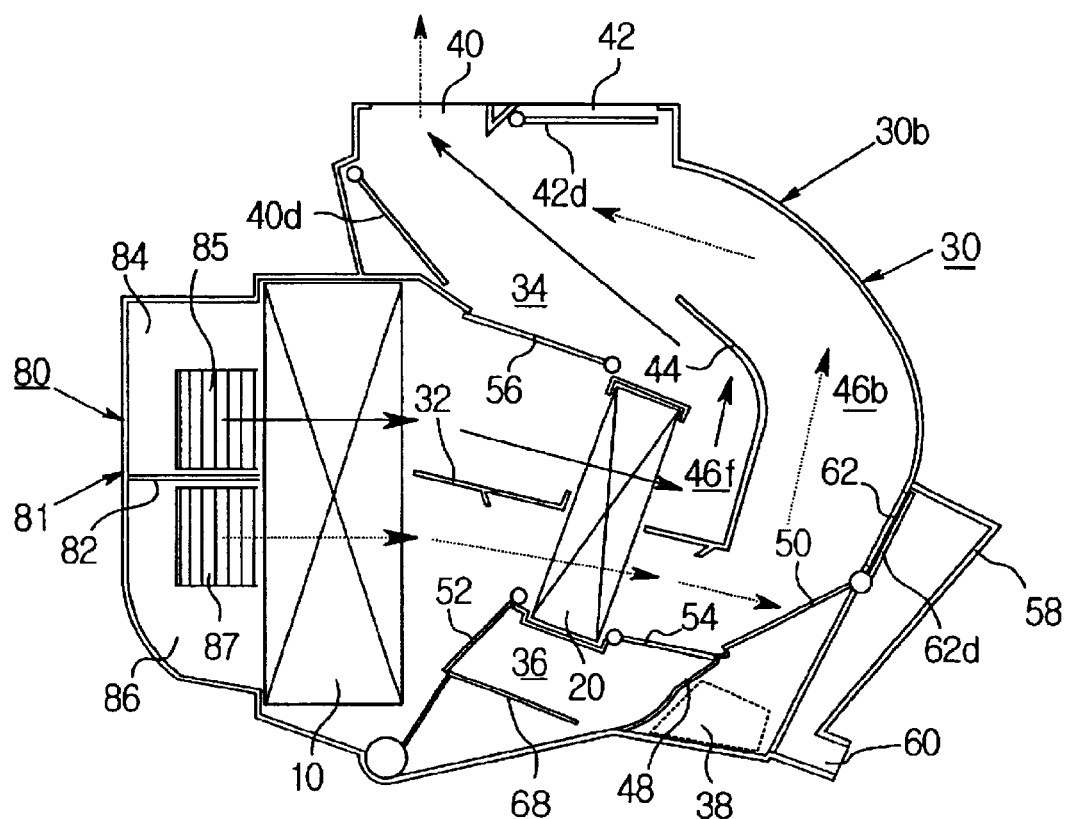
FIG. 10 is a partial cross section showing the flows of air in the air conditioner of FIG. 3 in a heating defrosting mode.
Figure 11:
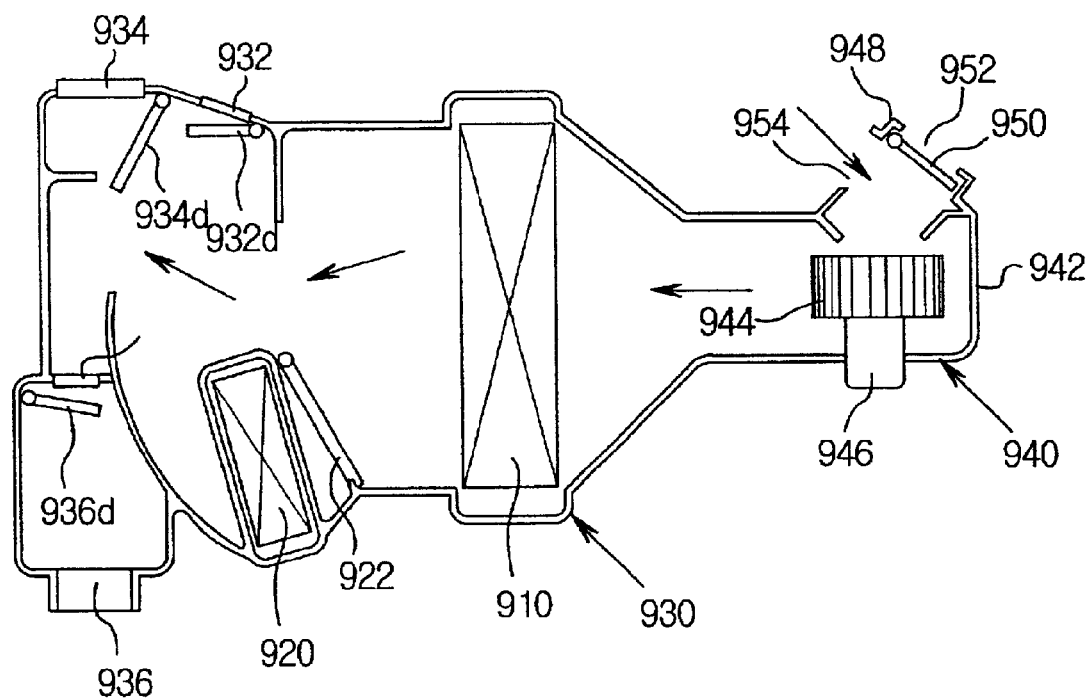
FIG. 11 is a partial cross section showing a general air conditioner.

In a heating defrosting mode, as shown in FIG. 10, the first and second temperature adjusting doors 52 and 54 are operated to both open the air passage extended to the lower half of the heater core 20 and close the lower air passage 36. Additionally, the combined door of foot and combination door 50 is operated to close the front foot vent 38 and open the rear air passage 46b by being brought into contact with the baffle 48 at its free end. The first communication door 62d is operated to close the first communication foot vent 62. Additionally, the third temperature adjusting door 56 is operated to open the air passage extended to the upper half of the heater core 20 and close the air passage extended over the heater core 20. Additionally, the defrosting door 40d is operated to open the defrosting vent 40, and the face door 42d is operated to close the face vent 42. Accordingly, all the air flowing through the lower air passage 36 passes through the upper half of the heater core 20 and flows toward the defrosting vent 40 through the rear air passage 46b, while all the air flowing through the upper air passage 34 passes through the upper half of the heater core 20, flows toward the defrosting vent 40 along the front surface of the guide wall 44 and is discharged to the passenger compartment through the defrosting vent 40. In this mode, the air intake mode is preferably an fresh air intake mode.

Various modes for discharging air blown according to each set air intake mode is set to the passenger compartment, that is, air conditioning modes, are summarized in the following table 1.

TABLE 1

| Air conditioning mode | Air intake mode | | Temperature of air | | discharge air volume (%) (±5%) | | | | Remarks |
|---|---|---|---|---|---|---|---|---|---|
| | Upper air passage | Lower air passage | Upper air passage | Lower air passage | Face vent | Front foot vent | Rear foot vent | Defrosting vent | |
| Face vent mode | Recirculation air | Recirculation air | Cold air | Cold air | 100 | 0 | 0 | 0 | Recirculation air intake mode |
| Bi-level mode | Recirculation air (fresh air) | Recirculation air (fresh air) | Cold air (+warm air) | Cold air (+warm air) | 60 | 25 | 15 | 0 | Recirculation air intake mode or fresh air intake mode |
| Foot and defrosting mode | Fresh air | Recirculation air | Warm air | Warm air | 0 | 45 (recirculation air) | 30 recirculation and fresh air or fresh air) | 25 (fresh air) | Recirculation air/ fresh air partitioning intake mode |
| | Fresh air | Fresh air | Warm air | Warm air | 0 | 40–45 | 25–30 | 0 | Fresh air intake mode |
| Mixing mode | Fresh air | Recirculation air | Warm air | Warm air | 0 | 35 (recirculation air) | 20 (recirculation and fresh air or fresh air) | 45 (fresh air) | Recirculation air/ fresh air partitioning intake mode |
| | Fresh air | Fresh air | Warm air | Warm air | 0 | 35 | 20 | 45 | Fresh air intake mode |
| Defrosting mode | Fresh air | Fresh air | Warm air | Warm air | 0 | 0 | 0 | 100 | Fresh air intake mode |

In the air conditioner of the present invention, air discharged to the floor of the passenger compartment by the rear vent housing 58 can be controlled in the front and rear directions, so fog formed on the front window of the automobile can be removed by air discharged by the defrosting vent 40 and fog formed on the rear window of the automobile can be removed by air discharged by the rear foot vent 60, thereby improving its defrosting performance. Additionally, in this case, a part of air blown to the upper air passage 34 flows through the rear air passage 46b and is discharged through the rear foot vent 60, so the flow resistance against the upper air passage is reduced and the air volume is increased, thereby improving the heating performance of the air conditioner.

In addition, while recirculation air intake mode is shifted to fresh air intake mode, fresh and recirculation air is mixed in the air intake duct 90 in advance, thereby improving the air mixing performance of the air conditioner. Consequently, air is blown to the evaporator 10 with differences in temperature and humidity reduced by the mixing of high-temperature, high-humidity fresh air and low-temperature, low-humidity recirculation air, thereby preventing a white fogging.

What is claimed is:

1. An air conditioner housing for an air conditioner of an automobile, said air conditioner housing comprising:

a housing body having therein an evaporator accommodating space for accommodating an evaporator, a heater core accommodating space for accommodating a heater core, an inner air passage between the evaporator and heater core accommodating spaces, and a space behind the heater core accommodating space, wherein the heater core accommodating space is located between the inner air passage and the space behind the heater core accommodating space;

a first partitioning wall partitioning the inner air passage into first and second air passages for directing air from the evaporator accommodating space to first and second portions of the heater core accommodating space, respectively;

a first floor vent formed at an air outlet end of said second air passage for discharging air to a first portion of a floor of an interior of the automobile;

defrosting and face vents formed at an air outlet end of said first air passage for discharging air to an upper portion of the interior of the automobile, said defrosting and face vents being selectively opened and closed by doors;

a guide wall partitioning the space behind the heater core accommodating space into third and fourth air passages, wherein the third air passage is positioned between the guide wall and the first portion of the heater core accommodating space and communicated with the first air passage, and wherein the fourth air passage is formed behind the guide wall to communicate with the first and second air passages;

a combined door positioned between said fourth air passage and said second air passage for adjusting degrees of opening of said first floor vent and said fourth air passage;

first and second temperature adjusting doors rotatably disposed in front of and behind the second portion of said heater core accommodating space, respectively; and a third temperature adjusting door rotatably disposed in front of the first portion of said heater core accommodating space.

2. The air conditioner housing according to claim 1, further comprising:

a vent housing including a second floor vent for discharging air to a second portion of the floor of the interior of the automobile, said vent housing being attached to a wall of said housing body in a region extending from a part of said fourth air passage to said second air passage;

a first communication vent formed on the wall of said housing body in said region for allowing said fourth air passage and said second floor vent to communicate with each other; and a first communication door operated in conjunction with said combined door for adjusting a degree of opening of said first communication vent.

3. The air conditioner housing according to claim 2, wherein said combined door is connected to said first communication door by a hinged joint.

4. The air conditioner housing according to claim 2, wherein said first communication door is separated from said combined door.

5. The air conditioner housing according to claim 2, further comprising a second communication vent formed on the wall of said housing body, a degree of opening of said second communication vent being adjusted by a second communication door.

6. The air conditioner housing according to claim 1, wherein said heater core accommodating space is spaced apart from a bottom of said housing body by a predetermined interval so that, in a cooling mode, cold air always flows through a portion of said second air passage under the heater core.

7. The air conditioner housing according to claim 1, further comprising a baffle, said baffle being positioned at an end portion of said second air passage to selectively guide air flowing through the second air passage toward the first floor vent or the fourth air passage, said baffle closing the second air passage when said baffle is brought into contact with an end of the combined door when the combined door fully opens the first floor vent, and said baffle closing the second air passage when said baffle is brought into contact with an end of the second temperature adjusting door when the second temperature adjusting door fully opens air passages extending through the heater core.

8. The air conditioner housing according to claim 1, further comprising a condensed water outlet formed in a portion of the housing body under the evaporator accommodating space to discharge condensed water from the evaporator, and a baffle formed on a bottom of the housing body under the second air passage to guide the condensed water flowing under the heater core to the condensed water outlet.

* * * * *